(12) United States Patent
Nam et al.

(10) Patent No.: US 12,169,417 B2
(45) Date of Patent: Dec. 17, 2024

(54) POWER MANAGEMENT INTEGRATED CIRCUIT

(71) Applicant: SAMSUNG ELECTRONICS CO., LTD., Suwon-si (KR)

(72) Inventors: Hyun Seok Nam, Suwon-si (KR); Jeong Woon Kong, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 112 days.

(21) Appl. No.: 17/987,957

(22) Filed: Nov. 16, 2022

(65) Prior Publication Data

US 2023/0273631 A1 Aug. 31, 2023

(30) Foreign Application Priority Data

Feb. 25, 2022 (KR) .................. 10-2022-0024980
Jun. 16, 2022 (KR) .................. 10-2022-0073576

(51) Int. Cl.
 *G05F 1/56* (2006.01)
(52) U.S. Cl.
 CPC ..................................... *G05F 1/56* (2013.01)
(58) Field of Classification Search
 None
 See application file for complete search history.

(56) References Cited

U.S. PATENT DOCUMENTS

| | | | |
|---|---|---|---|
| 5,414,310 A | 5/1995 | Fattaruso | |
| 6,566,935 B1 | 5/2003 | Renous | |
| 6,710,583 B2 | 3/2004 | Stanescu et al. | |
| 6,771,052 B2 | 8/2004 | Ostojic | |
| 6,856,124 B2 | 2/2005 | Dearn et al. | |
| 7,608,942 B2 * | 10/2009 | Chun | G05F 1/56 307/29 |
| 9,088,176 B2 * | 7/2015 | Hendin | H02M 3/28 |
| 9,753,470 B1 | 9/2017 | Hawley et al. | |
| 9,915,962 B2 | 3/2018 | Lee et al. | |
| 9,941,844 B2 | 4/2018 | Khlat | |
| 10,447,159 B2 | 10/2019 | Gatard et al. | |
| 11,747,842 B1 * | 9/2023 | Zlotnik | G05F 1/46 327/108 |
| 2009/0237140 A1 | 9/2009 | Pae et al. | |

OTHER PUBLICATIONS

European Search Report dated Jul. 21, 2023 issued in corresponding European Patent Application No. EP 23 158 055.6.
First Office Action dated Aug. 2, 2023 issued in corresponding European Patent Application No. EP 23 158 055.6.

* cited by examiner

*Primary Examiner* — Thomas J. Hiltunen
(74) *Attorney, Agent, or Firm* — F. CHAU & ASSOCIATES, LLC

(57) ABSTRACT

A power management integrated circuit including: a first regulator configured to provide a first output signal to a component; a second regulator configured to provide a second output signal to the component; a third regulator configured to provide a third output signal to the component; a power tracker configured to track first, second and third output signals, aggregate an offset voltage with a selection signal, and generate a reference voltage, wherein the selection signal corresponds to one of the first, second and third output signals; and a sub-regulator configured to generate an input voltage corresponding to the reference voltage and provide the generated input voltage to the first, second and third regulators.

16 Claims, 8 Drawing Sheets

POWER MANAGEMENT INTEGRATED CIRCUIT

CROSS-REFERENCE TO RELATED APPLICATIONS

This application claims priority under 35 U.S.C. § 119 to Korean Patent Application No. 10-2022-0024980 filed on Feb. 25, 2022 and Korean Patent Application No. 10-2022-0073576 filed on Jun. 16, 2022 in the Korean Intellectual Property Office, the disclosures of which are incorporated by reference herein in their entireties.

1. TECHNICAL FIELD

The present disclosure relates to a power management integrated circuit.

2. DESCRIPTION OF THE RELATED ART

An electronic device may include a power management integrated circuit (PMIC). A PMIC is often included in battery-operated devices such as mobile phones and portable media players to decrease the amount of space required. The PMIC may supply power to each component of an electronic device such that the electronic device can be operated. The PMIC may supply the power required for a processor to operate. The processor may have a plurality of blocks configured to perform a specified function. The PMIC may supply power to each of the blocks. The PMIC may be electrically connected to the processor via an interface such that a plurality of clock signals with a specified voltage can be supplied to the blocks. Each of the clock signals supplied to each of the blocks may have a designated range.

The PMIC includes a plurality of low dropout regulators (LDOs) connected to a plurality of switching converters, respectively, to supply an output voltage with a low noise level to each of the blocks. Each of the LDOs does not use a battery voltage or a voltage directly input to the PMIC. Since a large difference between input and output voltages of the PMIC can result in a large power loss, the LDO uses an output voltage of a sub-regulator with high efficiency as an input power source. Accordingly, power loss caused by the LDO may be minimized.

SUMMARY

An embodiment of the present disclosure provides a power management integrated circuit with improved operation performance.

An embodiment of the present disclosure provides a power management integrated circuit with high performance efficiency by minimizing power loss by reducing a difference between an input and an output of a low dropout regulator (LDO).

An embodiment of the present disclosure provides a power management integrated circuit including: a first regulator configured to provide a first output signal to a component; a second regulator configured to provide a second output signal to the component; a third regulator configured to provide a third output signal to the component; a power tracker configured to track first, second and third output signals, aggregate an offset voltage with a selection signal, and generate a reference voltage, wherein the selection signal corresponds to one of the first, second and third output signals; and a sub-regulator configured to generate an input voltage corresponding to the reference voltage and provide the generated input voltage to the first, second and third regulators.

An embodiment of the present disclosure provides a power management integrated circuit including: a first loop circuit configured to output a first output signal; a second loop circuit configured to output a second output signal; a third loop circuit configured to output a third output signal; a power tracker configured to track the first, second and third output signals, aggregate an offset voltage with a selection signal which corresponds to one of the first, second and third output signals, and generate a reference voltage; and a charging circuit configured to generate an input voltage corresponding to the reference voltage and provide the input voltage to the first, second and third loop circuits.

An embodiment of the present disclosure provides a power management integrated circuit including: a first regulator configured to output a first output voltage and a first output current; a second regulator configured to output a second output voltage and a second output current; a third regulator configured to output a third output voltage and a third output current; a power tracker configured to track the first, second and third output voltages and the first, second and third output currents, aggregate an offset voltage with a selection signal, and generate a reference voltage, wherein the selection signal corresponds to the first output voltage, the second output voltage, the third output voltage, the first output current, the second output current or the third output current; and a sub-regulator configured to generate an input voltage corresponding to the reference voltage and provide the generated input voltage to the first, second and third regulators.

BRIEF DESCRIPTION OF THE DRAWINGS

The above and other features of the present disclosure will become more apparent by describing in detail embodiments thereof with reference to the attached drawings, in which.

DETAILED DESCRIPTION OF THE EMBODIMENTS

Hereinafter, a power management integrated circuit according to some embodiments of the present disclosure will be described with reference to the attached drawings.

Figure 1:
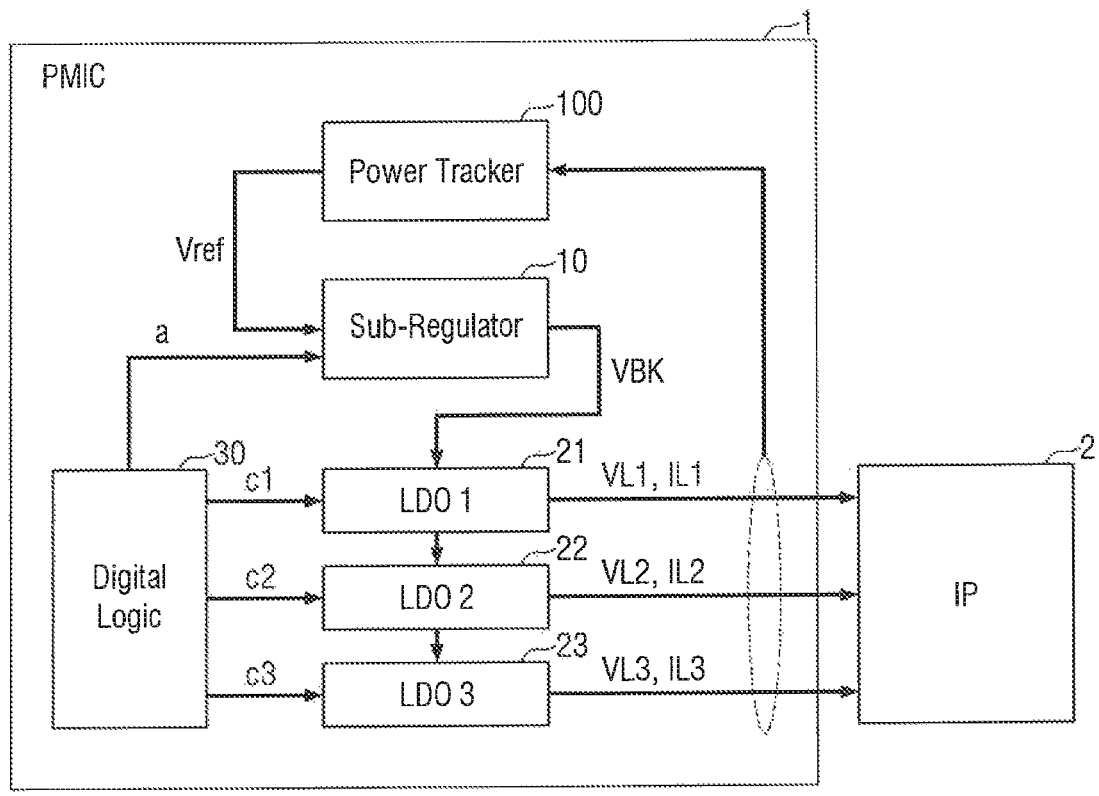
FIG. 1 is a block diagram illustrating a power management integrated circuit according to some embodiments of the present disclosure.

FIG. 1 is a block diagram illustrating a power management integrated circuit according to some embodiments of the present disclosure.

Referring to FIG. 1, a power management integrated circuit 1 may include a digital logic 30, low dropout regulators (LDOs) 21, 22 and 23, a sub-regulator 10, and a power tracker 100.

The power management integrated circuit 1 converts a voltage supplied from the outside or a battery voltage and outputs the converted voltage as an internal voltage (e.g., VL1, VL2 and VL3 and IL1, IL2 and IL3) suitable for an internal component (e.g., Intellectual Property; hereinafter referred to as "IP 2"). In addition, the power management integrated circuit 1 may control and output a clock frequency or a phase delay corresponding to an operation of the IP 2 according to various embodiments.

Although only one IP 2 is shown in FIG. 1, this is for convenience of description, and according to a variety of embodiments, since the power management integrated circuit 1 may be connected to a plurality of IPs 2, independent LDOs 21, 22 and 23 may be connected for each IP 2.

The digital logic 30 may output signals c1, c2 and c3 for controlling operations of the LDOs 21, 22 and 23. For example, the signals c1, c2 and c3 may control the magnitude of output voltages of the LDOs 21, 22 and 23, or may control activation or deactivation of the LDOs 21, 22 and 23.

According to some embodiments, the digital logic 30 may receive a control command for an output signal of the LDOs 21, 22 and 23 from the IP 2. The digital logic 30 may output control signals c1, c2 and c3 to the LDOs 21, 22 and 23 based on the control command and output a control signal a to the sub-regulator 10. The control signals a, c1, c2 and c3 may control an operation timing of an output signal output from the LDOs 21, 22 and 23 and the sub-regulator 10.

The LDOs 21, 22 and 23 may control a level conversion timing of output signals VL1, VL2 and VL3 and IL1, IL2 and IL3 based on the control signals c1, c2 and c3, and the sub-regulator 10 may control a level conversion timing of an input voltage VBK based on the control signal a.

The sub-regulator 10 provides the input voltage VBK to each of the LDOs 21, 22 and 23. According to some embodiments, the sub-regulator 10 may be any one of a BUCK conversion circuit, a boost conversion circuit, and a buck-boost conversion circuit as a switching converter.

The LDOs 21, 22 and 23 generate the output signal provided to the IP 2 based on the input voltage VBK of the sub-regulator 10. The output signal may be, for example, at least one of output voltages VL1, VL2 and VL3 or output currents IL1, IL2 and IL3 of the LDOs 21, 22 and 23. The LDOs 21, 22 and 23 generate an internal supply voltage required by the IP 2 as the output signal. For convenience of description, in FIG. 1, three LDOs 21, 22 and 23 are described, but the present disclosure is not limited thereto. For example, the PMIC 1 may include more than three regulators.

The power tracker 100 may track the output signals of the LDOs 21, 22 and 23, select any one output signal (e.g., any one of VL1, VL2, VL3, IL1, IL2 and IL3), and output the selected output signal as a selection signal Vsel. The power tracker 100 may generate a reference voltage Vref by aggregating an offset voltage Vk with the selection signal Vsel.

For example, the power tracker 100 may operate as a voltage tracker when the output signals of the LDOs 21, 22 and 23 are in a voltage form (e.g., an output voltage). For example, the power tracker 100 may operate as a current tracker when the output signals of the LDOs 21, 22 and 23 are in a current form (e.g., an output current). The operation will be described later in FIGS. 2 and 3.

Figure 2:
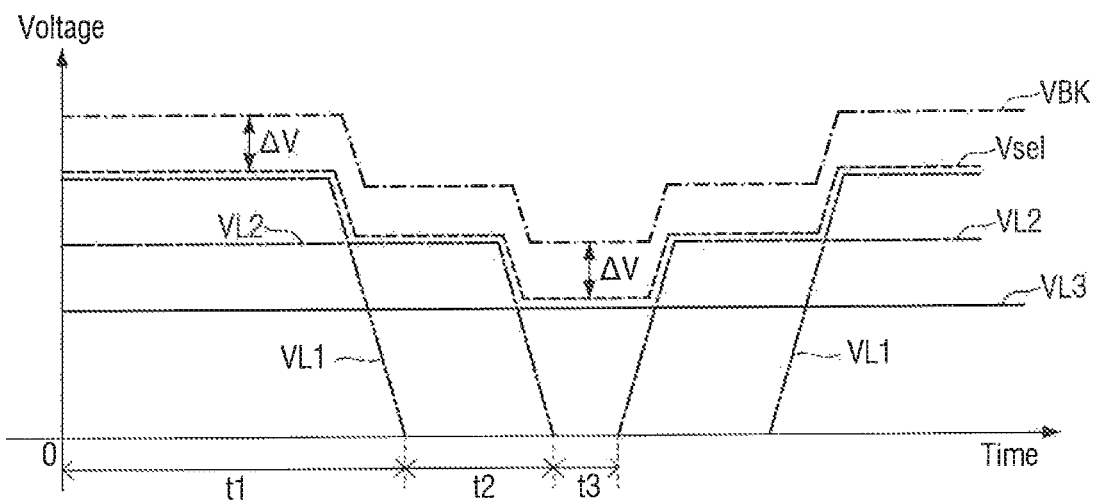
FIG. 2 is a voltage graph illustrating an operation of the power management integrated circuit in FIG. 1.

FIG. 2 is a voltage graph illustrating an operation of the power management integrated circuit in FIG. 1.

An operation state of the power management integrated circuit 1 may depend on a system operation scenario. For example, the power management integrated circuit 1 may operate in a normal mode that activates all of the LDOs 21, 22 and 23 and a standby mode that turns off most of the LDOs 21, 22 and 23 for a low-power operation. In the illustrated example of FIG. 2, it is assumed that the magnitude of the output voltage VL1 of the LDO 21, the output voltage VL2 of the LDO 22 and the output voltage VL3 of the LDO 23 are VL1>VL2>VL3.

All of the LDOs 21, 22 and 23 are turned on in a first section (0 to t1), the LDO 21 is turned off in a second section (t1 to t2), and the LDO 22 is turned off in a third section (t2 to t3). The LDO21 is also turned off in the third section (t2 to t3). The power tracker 100 selects the smallest voltage among the output voltages VL1 to VL3 as the selection voltage Vsel, and generates the input voltage VBK of the LDOs 21, 22 and 23 based on the selection voltage Vsel. The power consumption of the LDOs 21, 22 and 23 may be defined as ΔV×IL, where ΔV is a difference between the input voltage VBK and the output voltages VL1 to VL3, and IL is a sum of currents in the turned-on LDOs.

When the input voltage VBK is constantly supplied without considering a variation of the output voltages VL1 to VL3, the power loss may be larger in the third period (e.g., the third section t2 to t3) in which only the LDO 23 is turned on than in the first period (e.g., the first section 0 to t1) in which all of the LDOs 21, 22 and 23 are turned on. To reduce the power loss, when the input voltage VBK is controlled to correspond to outputs of the turned-on LDOs, in other words, when the difference ΔV between the input voltage and the output voltage of the turned-on LDOs is controlled to be constant, the power loss caused by turning on or off the LDOs may be prevented.

Therefore, the power management integrated circuit according to the embodiments of the present disclosure generates the input voltage VBK provided to the LDO according to the selection signal Vsel in which the output signals of the LDO have been tracked. In other words, the input voltage VBK is changed by tracking the selection signal Vsel, thereby losing only the minimum power.

Figure 3:
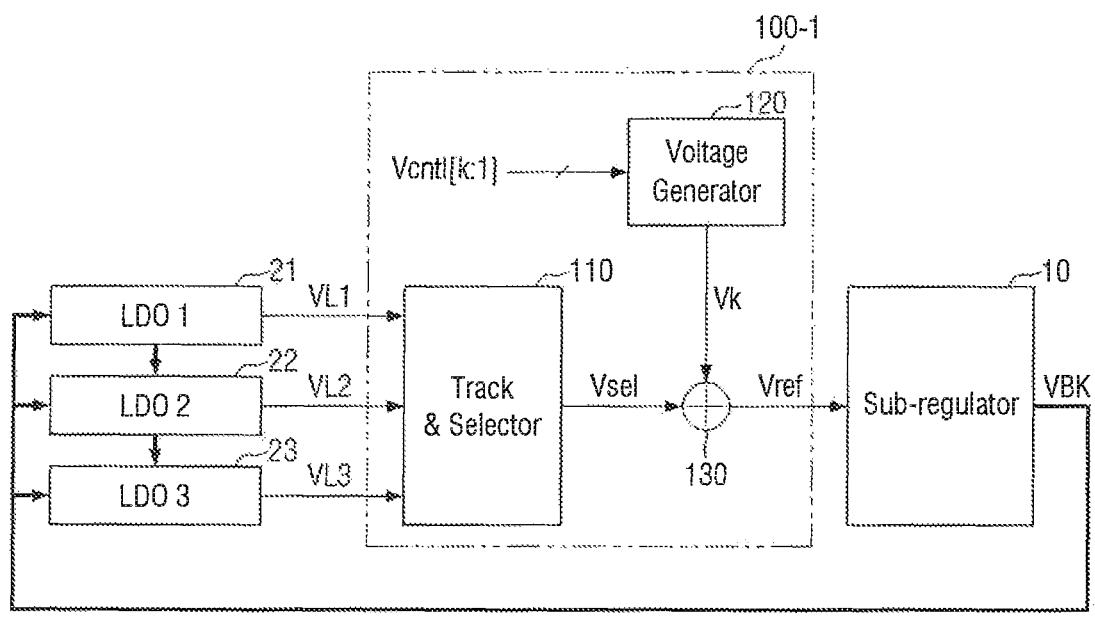
FIG. 3 is a block diagram illustrating a power tracker according to some embodiments of the present disclosure.

FIG. 3 is a block diagram illustrating a power tracker according to some embodiments.

Referring to FIG. 3, a power tracker 100-1 according to some embodiments includes a track and selection unit 110, a voltage generator 120, and an aggregation node 130.

The track and selection unit 110 tracks the output voltages VL1, VL2 and VL3 of the plurality of LDOs 21, 22 and 23, selects the output voltage of any one of the turned-on LDOs, and outputs the selected output voltage as the selection signal Vsel. The selection signal Vsel may have a maximum value selected from the output voltages VL1, VL2 and VL3 of the turned-on LDOs according to some embodiments, have a minimum value selected from the output voltages VL1, VL2 and VL3 of the turned-on LDOs, or an intermediate value selected from the output voltages VL1, VL2 and VL3 of the turned-on LDOs. Hereinafter, although a case of outputting the output voltage having a maximum value among the output voltages VL1, VL2 and VL3 of the turned-on LDOs as the selection signal Vsel is described as an example, the present disclosure is not limited thereto, as noted above.

The voltage generator 120 generates the offset voltage Vk according to a reference control signal Vcnt[k:1]. The reference control signal Vcnt[k:q] may control a level of the offset voltage Vk.

The aggregation node 130 generates the reference voltage Vref by aggregating the selection signal Vsel and the offset voltage Vk, and provides the reference voltage Vref to the sub-regulator 10. The aggregation node is also called a summing node.

The sub-regulator 10 generates the input voltage VBK of the LDOs 21, 22 and 23 corresponding to the reference voltage Vref.

Figure 4:
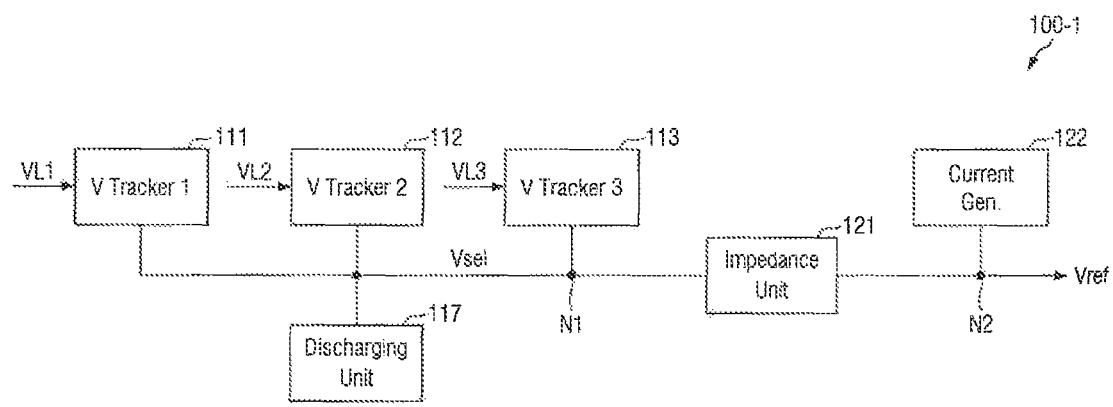
FIG. 4 is a block diagram illustrating the power tracker according to some embodiments of the present disclosure.

FIG. 4 is a block diagram illustrating the power tracker according to some embodiments.

Referring to FIG. 4, the power tracker 100-1 according to some embodiments may include the track and selection unit 110.

The track and selection unit 110 may continuously track the output signals VL1, VL2 and VL3 of the plurality of LDOs 21, 22 and 23 and detect one of them as the selection signal Vsel. The track and selection unit 110 may include a first tracker 111, a second tracker 112, a third tracker 113, and a discharging unit 117. The first tracker 111 may be connected to an output terminal of the LDO 21 to track the output signal VL1 of the LDO 21. The second tracker 112 may be connected to an output terminal of the LDO 22 to track the output signal VL2 of the LDO 22. The third tracker 113 may be connected to an output terminal of the LDO 23 to track the output signal VL3 of the LDO 23. The output signal may be, for example, the output voltages VL1, VL2 and VL3. In the illustrated embodiment of FIG. 4, the case in which the output signals are the output voltages VL1, VL2 and VL3 is described as an example, but according to various embodiments, the output signals may be the output currents IL1, IL2 and IL3.

The first tracker 111, the second tracker 112, and the third tracker 113 may output a signal tracked to a common output node N1. For example, the first tracker 111 may output a first output signal to the common output node N1, the second tracker 112 may output a second output signal to the common output node N1, and the third tracker 113 may output a third output signal to the common output node N1.

The discharging unit 117 may be connected to the common output node N1 to discharge a current along a voltage direction of the selection signal Vsel. The discharging unit 117 allows the common output node N1 to continuously track the selection signal Vsel. According to some embodiments, the discharging unit 117 may be implemented with a resistor or with a current source.

According to some embodiments, the power tracker 100-1 may generate a preset offset voltage and provide the generated offset voltage to the aggregation nodes 130 and N2.

Alternatively, according to some embodiments, the power tracker 100-1 may further include the voltage generator 120 configured to generate an offset voltage whose level is controlled by the reference control signal Vcnt[k:1]. The voltage generator 120 may include, for example, an impedance unit 121 and a current generator 122. The impedance unit 121 may have a preset impedance according to some embodiments, or may have a programmable impedance according to some embodiments. The current generator 122 may generate the offset current according to the reference control signal Vcnt[k:1], and generate the offset voltage Vk by reflecting the offset current in the impedance unit 121.

The selection signal Vsel is aggregated (or added or summed) with the offset voltage Vk in the aggregation node N2 (130 in FIG. 3) and is output as the reference voltage Vref.

Figure 5:
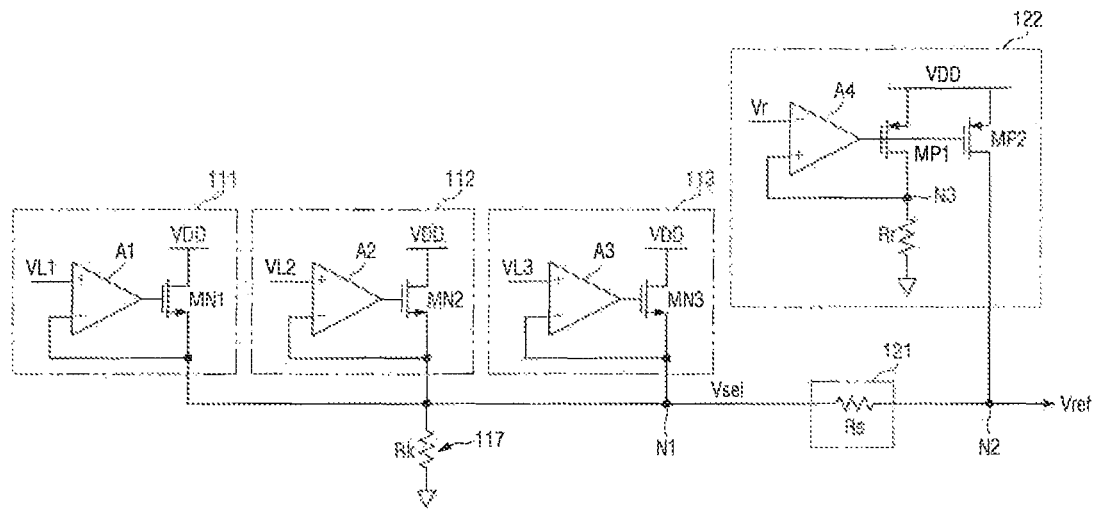
FIG. 5 is a circuit diagram illustrating the power tracker according to some embodiments of the present disclosure.

FIG. 5 is a circuit diagram illustrating the power tracker according to some embodiments.

Referring to FIGS. 4 and 5, the first tracker 111, the second tracker 112, and the third tracker 113 may include amplifiers A1, A2 and A3, and may output the selection signal Vsel at a voltage higher or lower than the output signals VL1, VL2 and VL3 that are input by controlling a gain of the amplifier.

For example, the first tracker 111 may include the amplifier A1 and a transistor MN. The amplifier A1 may receive the output voltage VL1 of the LDO 21 as input and a voltage of the common output node N1 an input, respectively, and compare the output voltage VL1 of the LDO 21 with the voltage of the common output node N1, thus outputting a first comparison signal. The transistor MN1 may be connected between a power terminal VDD and the common output node N1, and may be gated with the first comparison signal to output a first candidate selection signal corresponding to the first comparison signal via the common output node N1.

For example, the second tracker 112 may include the amplifier A2 and a transistor MN2. The amplifier A2 may receive the output voltage VL2 of the LDO 22 as input and the voltage of the common output node N1 as input, respectively, and compare the output voltage VL2 of the LDO 22 with the voltage of the common output node N1, thus outputting a second comparison signal. The transistor MN2 may be connected between the power terminal VDD and the common output node N1, and may be gated with the second comparison signal to output a second candidate selection signal corresponding to the second comparison signal via the common output node N1.

For example, the third tracker 113 may include the amplifier A3 and a transistor MN3. The amplifier A3 may receive the output voltage VL3 of the LDO 23 as input and the voltage of the common output node N1 as input, respectively, and compare the output voltage VL3 of the LDO 23 with the voltage of the common output node N1, thus outputting a third comparison signal. The transistor MN3 may be connected between the power terminal VDD and the common output node N1 and may be gated with the third comparison signal to output a third candidate selection signal corresponding to the third comparison signal via the common output node N1.

In other words, the first tracker 111, the second tracker 112, and the third tracker 113 track the output signals of the LDOs 21, 22 and 23 in the form of a voltage source follower.

According to an embodiment of the discharging unit 117, a resistor Rk may be further included in the common output node N1.

The amplifiers A1, A2 and A3 may detect the selection signal Vsel by tracking an output of any one of the first candidate selection signal, the second candidate selection signal, and the third candidate selection signal, according to some embodiments. For example, in the graph of FIG. 2, when the output voltage VL1 is greater than the output voltage VL2, VL1>VL2 (e.g., the first section 0 to t1) in a state in which all of the LDOs are turned on, the track and selection unit 110 continuously tracks the first candidate selection signal of the amplifier A1 to detect the selection signal Vsel, and the other transistors MN2 and MN3 turn off their LDOs. Then, when the LDO 21 is turned off such that the output voltage VL1 becomes less than the output voltage VL2, VL1<VL2 (e.g., the second section t1 to t2), the track and selection unit 110 may continuously track only the second candidate selection signal (e.g., the second candidate selection signal as the selection signal Vsel), and the other transistors MN1 and MN3 may turn off their LDOs.

In one embodiment, the impedance unit 121 may be an impedance resistor Rs. The impedance resistor Rs may be connected between the common output node N1 and the aggregation node N2.

The current generator 122 may include a reference amplifier A4, a reference resistor Rr, and two reference transistors MP1 and MP2 according to some embodiments.

The reference amplifier A4 outputs a reference signal by comparing a control voltage Vr with the output voltage of a comparison node N3. For example, the reference amplifier A4 may be implemented to receive the control voltage Vr at an inversion terminal (−) and connect a non-inversion terminal (+) thereof to the comparative node N3, but according to another embodiment, a connection of the non-inversion terminal and the inversion terminal may be implemented in reverse. According to some embodiments, the control voltage Vr may be a voltage whose level is controlled according to the reference control signal Vcnt[k:1].

A first reference transistor MP1 is gated by the reference signal and is connected between the power terminal VDD and the comparison node N3. The reference resistor Rr is connected between the comparison node and a ground terminal. A second reference transistor MP2 is connected between the power terminal VDD and the aggregation node N2 and is gated by the reference signal to generate an offset current.

The offset current is reflected in an impedance resistor 121 and converted into the offset voltage, and the offset voltage Vk and the selection signal Vsel are aggregated in the aggregation node N2 to generate the reference voltage Vref.

Figure 6:
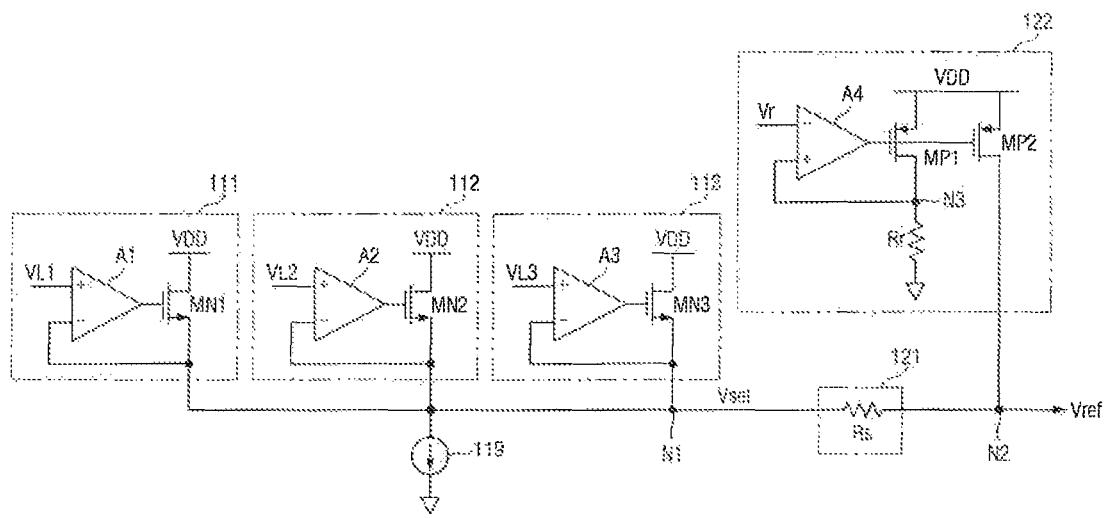
FIG. 6 is a circuit diagram illustrating the power tracker according to some embodiments of the present disclosure.

FIG. 6 is a circuit diagram illustrating the power tracker according to some embodiments. For convenience of description, the difference from FIG. 5 will be mainly described, and redundant descriptions will be omitted.

Unlike FIG. 5, the power tracker in FIG. 6 may include a current source 119 as a discharging unit. The current source 119 may also discharge a current along the voltage direction of the selection signal Vsel.

In the example illustrated in FIG. 6, in the amplifiers A1, A2 and A3, the output voltages VL1, VL2 and VL3 of the LDOs 21, 22 and 23 may be applied to the non-inversion terminal, and the inversion terminal may be connected to the common output node N1, but the present disclosure is not limited thereto. According to another embodiment, the connection of the non-inversion terminal and the inversion terminal may be implemented in reverse. In the illustrated example of FIG. 6, the transistors MN1, MN2 and MN3 are an N-type transistor, but according to another embodiment, a P-type transistor may also be used.

Figure 7:
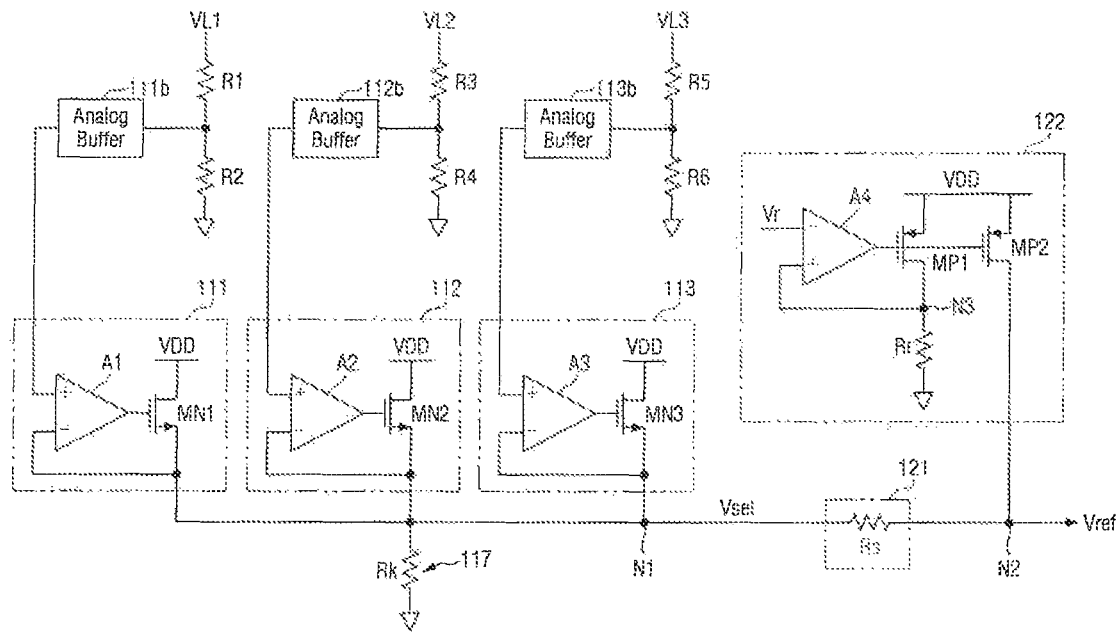
FIG. 7 is a circuit diagram illustrating the power tracker according to some embodiments of the present disclosure.

FIG. 7 is a circuit diagram illustrating the power tracker according to some embodiments. For convenience of description, the difference from FIG. 5 will be mainly described, and redundant descriptions will be omitted.

Referring to FIG. 7, in the amplifiers A1, A2 and A3, voltages input to the non-inversion terminals may not be originally input without changing the output voltages VL1, VL2 and VL3 of the LDOs 21, 22 and 23, but be input by converting the voltage levels of the output voltages VL1, VL2 and VL3 of the LDOs 21, 22 and 23.

For example, distribution resistors R1 and R2 and an analog buffer 111b may be further included between the LDO 21 and the non-inversion terminal of the amplifier A1. The output voltage of the LDO 21 may be distributed according to a ratio of the distribution resistors R1 and R2, and then input to the non-inversion terminal of the amplifier A1 through the analog buffer 111b.

Likewise, the output voltage of the LDO 22 may be distributed according to a ratio of distribution resistors R3 and R4, and then input to the non-inversion terminal of the amplifier A2 through an analog buffer 112b. The output voltage of the LDO 23 may be distributed according to a ratio of distribution resistors R5 and R6, and then input to the non-inversion terminal of the amplifier A1 through an analog buffer 113b.

According to some embodiments, the distribution resistors R1, R2, R3, R4, R5 and R6 may have the same value. Alternatively, according to some embodiments, the distribution resistors R1, R2, R3, R4, R5 and R6 may have different values in consideration of characteristics of the LDOs 21, 22 and 23.

When level-converted output voltages VL1, VL2 and VL3 are input to the amplifiers A1, A2 and A3, the power tracker of FIG. 7 can be operated with less power consumption.

Figure 8:
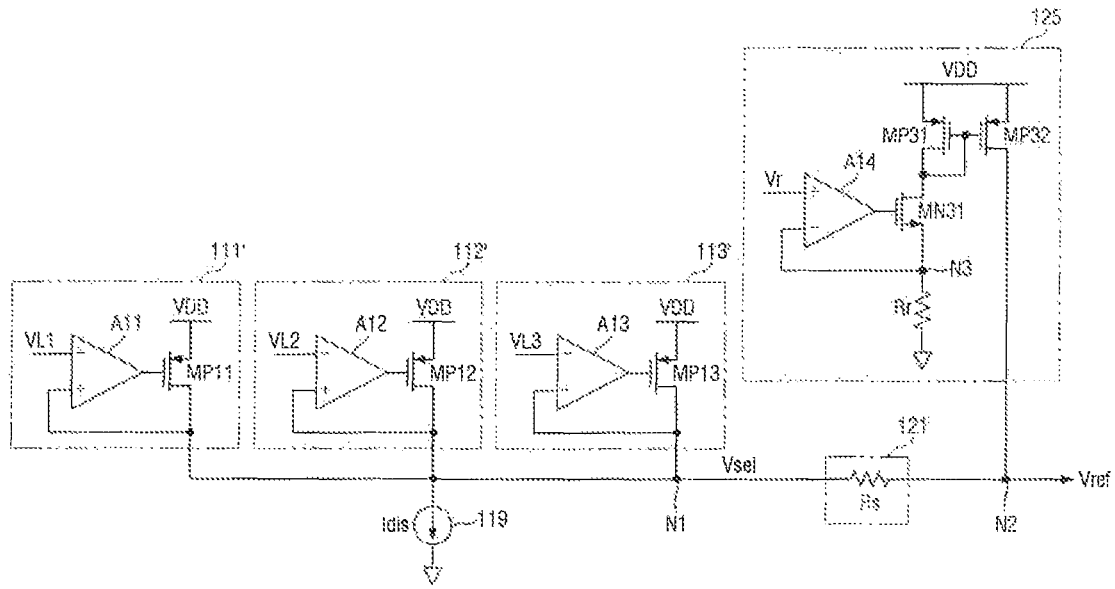
FIG. 8 is a circuit diagram illustrating the power tracker according to some embodiments of the present disclosure.

FIG. 8 is a circuit diagram illustrating the power tracker according to some embodiments. For convenience of description, the difference from FIG. 5 will be mainly described, and redundant descriptions will be omitted.

Referring to FIG. 8, unlike FIG. 6, in the amplifiers A11, A12 and A13, the output voltages VL1, VL2 and VL3 of the LDO 21, 22 and 23 may be applied to the inversion terminal (−), and the non-inversion terminal (+) may be connected to the common output node N1. In the illustrated example of FIG. 8, for the transistors, the P-type transistors MP11, MP12 and MP13 may be employed.

A first tracker 111' may include an amplifier A11 and a transistor MP11. The amplifier A11 may receive the output voltage VL1 of the LDO 21 at the inversion terminal (−) and the voltage of the common output node N1 at the non-inversion terminal (+), compare the output voltage VL1 of the LDO 21 with the voltage of the common output node N1, and output the first comparison signal to a gate of the transistor MP11. The transistor MP11 may be connected between the power terminal VDD and the common output node N1 and may be gated with the first comparison signal, thus outputting the first candidate selection signal corresponding to the first comparison signal via the common output node N1.

For example, the second tracker 112' may include an amplifier A12 and a transistor MP12. The amplifier A12 may receive the output voltage VL2 of the LDO 22 at the inversion terminal and the voltage of the common output node N1 at the non-inversion terminal, compare the output voltage VL2 of the LDO 22 with the voltage of the common output node N1, and output the second comparison signal to a gate of the transistor MP12. The transistor MP12 may be connected between the power terminal VDD and the common output node N1 and may be gated with the second comparison signal, thus outputting the second candidate selection signal corresponding to the second comparison signal via the common output node N1.

For example, the third tracker 113 may include an amplifier A13 and a transistor MP13. The amplifier A13 may receive the output voltage VL3 of the LDO 23 at the inversion terminal and the voltage of the common output node N1 at the non-inversion terminal, compare the output voltage VL3 of the LDO 23 with the voltage of the common output node N1, and output the third comparison signal to a gate of the transistor MP13. The transistor MP13 may be connected between the power terminal VDD and the common output node N1 and may be gated with the third comparison signal, thus outputting the third candidate selection signal corresponding to the third comparison signal via the common output node N1.

For example, a reference amplifier A14 included in a current generator 125 compares the control voltage Vr with the output voltage of the comparison node N3 and outputs a reference signal (e.g., a result of the comparison) to a gate of a comparison reference transistor MN31. The reference amplifier A14 may be implemented to apply the control voltage Vr to the non-inversion terminal (+) and connect the inversion terminal (−) to the comparison node N3. The comparison reference transistor MN31 may be connected to a P-type complementary transistor. Source terminals of a first reference complementary transistor MP31 and a second reference complementary transistor MP32 are connected to a power supply terminal VDD, and a drain of the first reference complementary transistor MP31 is connected to a drain of the comparison reference transistor MN31. A drain terminal of the second reference complementary transistor MP32 is connected to the aggregation node N2. Gate terminals of the first reference complementary transistor MP31 and the second reference complementary transistor MP32 are connected to the drain terminal of the first reference complementary transistor MP31.

In other words, the reference signal output from the reference amplifier A14 may gate the comparison reference transistor MN31, and generate the offset current by the first and second reference complementary transistors MP31 and MP32 that form a current mirror circuit, and the offset current may generate the offset voltage based on the impedance unit 121.

As a result, the offset voltage Vk and the selection voltage Vsel are aggregated in the aggregation node N2 to output the reference voltage Vref.

Figure 9:
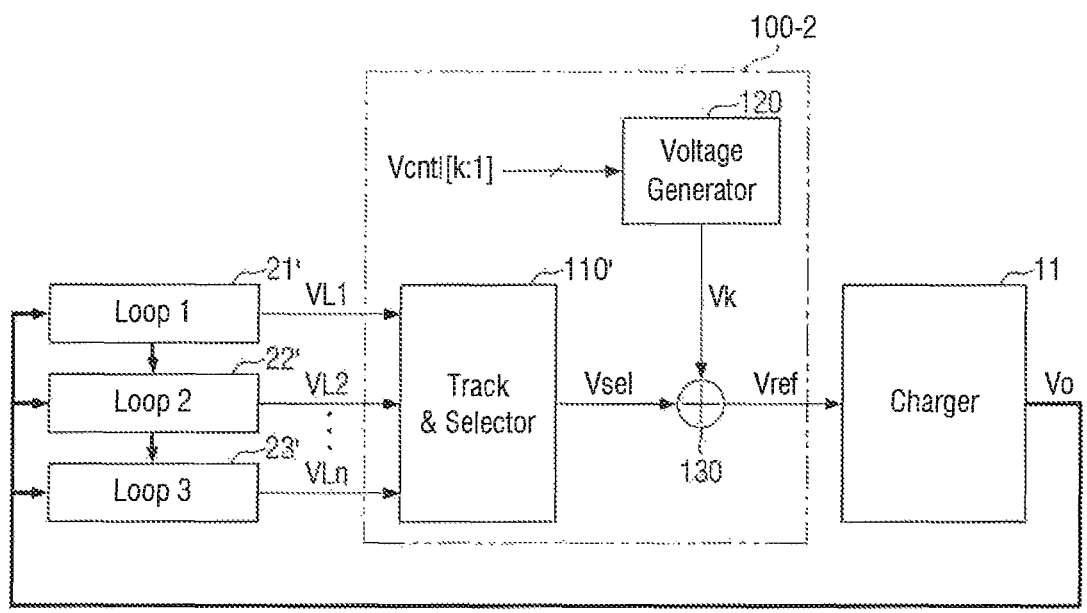
FIG. 9 is a block diagram illustrating the power management integrated circuit according to some embodiments of the present disclosure.
Figure 10:
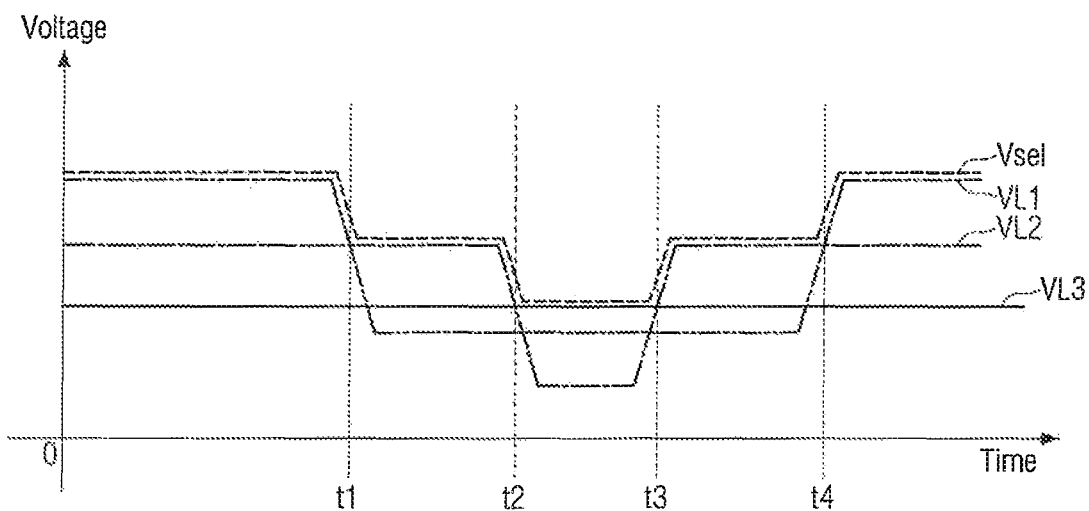
FIG. 10 is a voltage graph illustrating an operation of the power management integrated circuit in FIG. 9.

FIG. 9 is a block diagram illustrating the power management integrated circuit according to some embodiments, and FIG. 10 is a voltage graph illustrating an operation of the power management integrated circuit in FIG. 9. For convenience of description, the difference from the embodiment in FIG. 3 will be mainly described, and redundant descriptions will be omitted.

Referring to FIGS. 9 and 10, the power management integrated circuit according to some embodiments includes a plurality of loop circuits 21', 22' and 23', a power tracker 100-2, and a charging circuit 11.

For example, a first loop circuit 21' may be a constant voltage loop circuit, a second loop circuit 22' may be a constant current loop circuit, and a third loop circuit 23' may be an input voltage loop circuit. The first loop circuit 21' outputs a first output signal VL1, the second loop circuit 22' outputs a second output signal VL2, and the third loop circuit 23' outputs a third output signal VL3.

The power tracker 100-2 tracks the first to third output signals VL1, VL2 and VL3 and detects any one of the first to third output signals VL1, VL2 and VL3 as the selection signal Vsel. The power tracker 100-2 aggregates the offset voltage Vk with the selection signal Vsel to generate the reference voltage Vref and provides the reference voltage Vref to the charging circuit 11.

The power tracker 100-2 includes a track and selection unit 110' configured to output the selection signal Vsel to the common output node N1.

According to some embodiments, the power tracker 100-2 may further include the voltage generator 120 that provides the offset voltage whose level is controlled by the reference control signal Vcnt[k:1] to the aggregation node 130. Alternatively, according to some embodiments, the power tracker 100-2 may provide the preset offset voltage to the aggregation node 130.

The charging circuit 11 generates an input voltage Vo corresponding to the reference voltage Vref, and provides the input voltage Vo to the first to third loop circuits 21', 22' and 23'.

For example, it is assumed that the size of the first output signal VL1, the second output signal VL2, and the third output signal VL3 is VL1>VL2>VL3, and the selection signal Vsel detects a maximum value among the tracked output signals.

Referring to FIG. 10, the track and selection unit 110' tracks and detects the highest voltage for each section among the first to third output signals VL1, VL2 and VL3. In the illustrated example of FIG. 10, the first output signal VL1 is detected in the first section (e.g., 0 to t1), the second output signal VL2 is detected in the second section (e.g., t1 to t2), and the third output signal VL3 is detected in the third section (e.g., t2 to t3), respectively, and the first to third output signals VL1, VL2 and VL3 are output as the selection signal Vsel.

Figure 11:
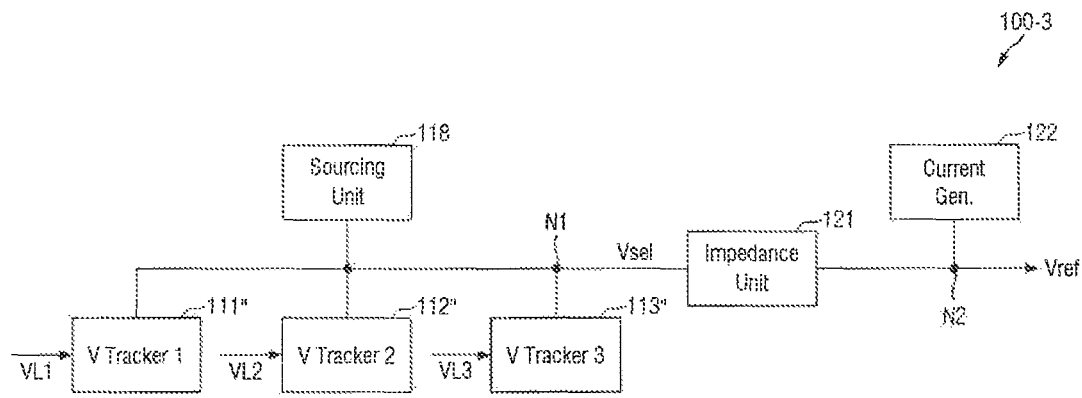
FIG. 11 is a block diagram illustrating the power tracker according to some embodiments of the present disclosure.
Figure 12:
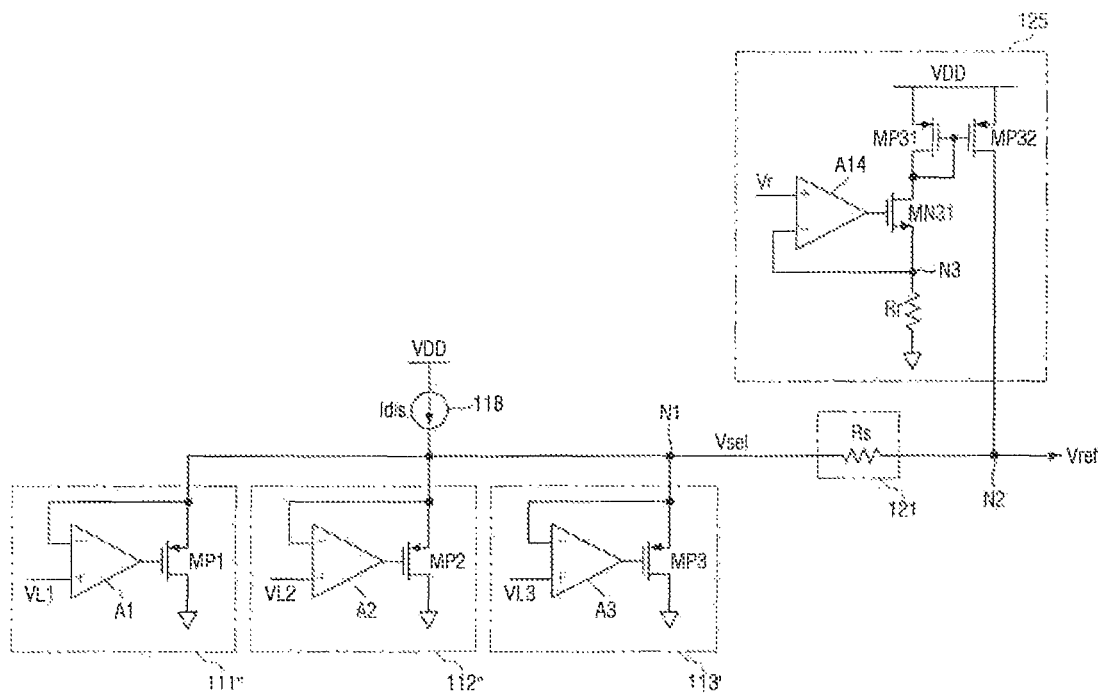
FIG. 12 is a diagram illustrating a circuit diagram of the power tracker in FIG. 11.

FIG. 11 is a block diagram illustrating the power tracker according to some embodiments, and FIG. 12 is a diagram illustrating a circuit diagram of the power tracker in FIG. 11.

Referring to FIG. 11, a power tracker 100-3 may include a first tracker 111", a second tracker 112", a third tracker 113", and a sourcing unit 118.

According to some embodiments, the power tracker 100-3 may further include the impedance unit 121 and a current generator 125. The impedance unit 121 and the current generator 125 may generate the offset voltage.

According to some embodiments, the first tracker 111" may include an amplifier A1 and a transistor MP1. The amplifier A1 may receive the output signal VL1 of the first loop circuit 21' at the non-inversion terminal, and receive the voltage of the common output node N1 at the inversion terminal, thus outputting the first comparison signal. The transistor MP1 may be connected between the common output node N1 and the ground terminal, and may output the first candidate selection signal corresponding to the first comparison signal. Since the second tracker 112" and the third tracker 113" have the same structure as the first tracker 111", the description thereof is omitted. For example, the amplifier A2 of the second tracker 112" may receive the output signal of the second loop circuit 22' and the amplifier A3 of the third tracker 113" may receive the output signal of the third loop circuit 23'.

The sourcing unit 118 is disposed between the power supply terminal VDD and the common output node N1 to discharge the current along the voltage direction of the selection signal Vsel. The sourcing unit 118 may be, for example, a current source Idis.

The impedance unit 121 may be, for example, a simple resistor, or as another example, a variable programmable resistor.

Since the current generator 125 may be implemented similarly to the current generator 125 in FIG. 8 according to some embodiments, the description thereof will be omitted.

When the sourcing unit 118 and the first to third trackers 111", 112" and 113" are implemented as illustrated in FIG. 11, the power tracker 100-3 may continuously track the output voltage of the LDO, unlike FIG. 3, and detect a minimum value among the output voltages as the selection signal Vsel.

Figure 13:
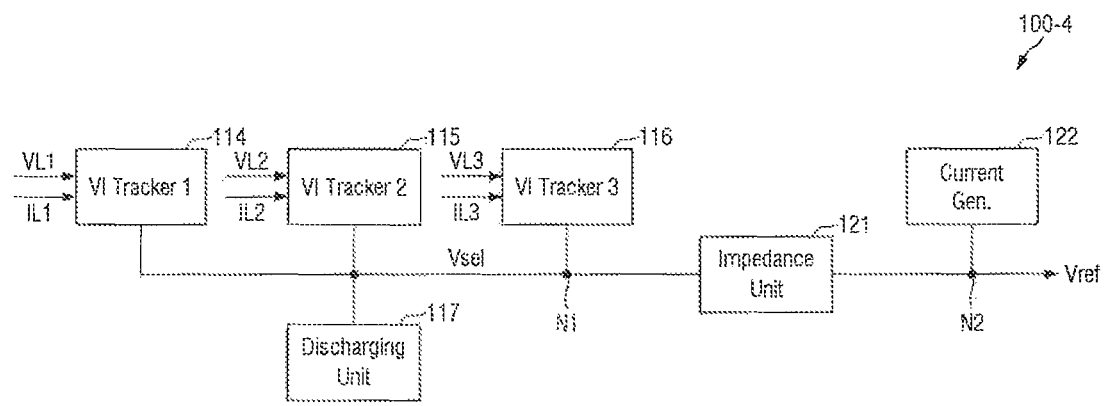
FIG. 13 is a block diagram illustrating the power tracker according to some embodiments of the present disclosure.
Figure 14:
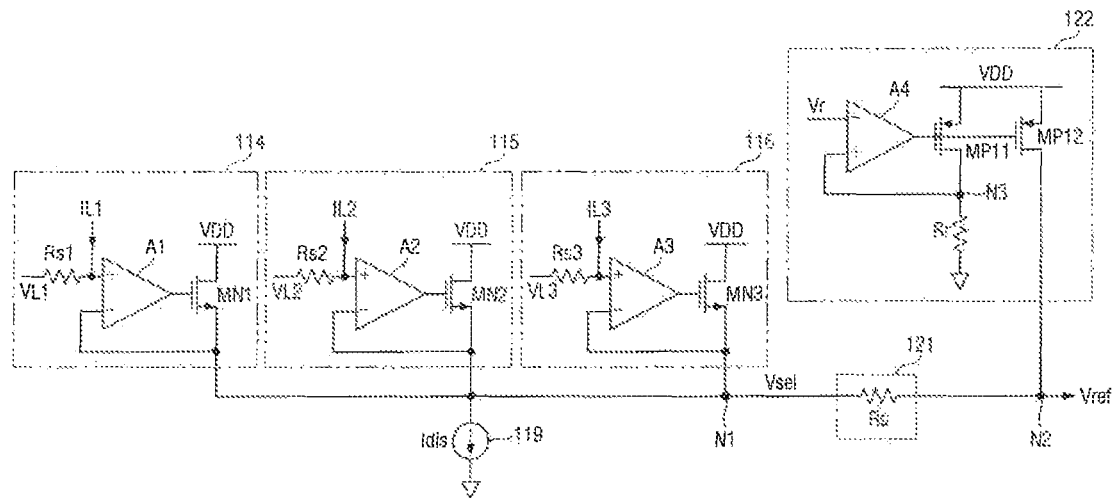
FIG. 14 is a diagram illustrating a circuit diagram of the power tracker in FIG. 13.

FIG. 13 is a block diagram illustrating the power tracker according to some embodiments, and FIG. 14 is a diagram illustrating a circuit diagram of the power tracker in FIG. 13. For convenience of description, a description overlapping that of FIG. 3 will be omitted.

Referring to FIG. 13, a power tracker 100-4 may generate the selection signal Vsel by tracking the output voltage VL (e.g., VL1, VL2 and VL3) and an output current IL (e.g., IL1, IL2 and IL3) of the LDOs 21, 22 and 23 like FIG. 3 or the loop circuits 21', 22' and 23' like FIG. 9, and aggregate the offset voltage with the selection signal Vsel, thus generating the reference voltage Vref.

According to some embodiments, the power tracker 100-4 may include a plurality of trackers 114, 115 and 116 configured to track the output voltage and the output current from each of the LDOs or each of the loop circuits.

For example, the first tracker 114 may include an input resistor Rs1, the amplifier A1, and the transistor MN1. In the amplifier A1, a first input terminal may be connected to the common output node N1, a second input terminal may be connected to a first end of the input resistor Rs1, and a comparison signal obtained by comparing signals of the first input terminal and the second input terminal may be generated and applied to a gate of the transistor MN1. The output power voltage VL of the LDO or the loop circuit may be provided to a second end of the input resistor Rs1, and the output current IL of the LDO or the loop circuit may be provided to the first end of the input resistor Rs1. A second tracker 115 and a third tracker 116 may be implemented to have the same structure as the first tracker 114. For example, the second tracker 115 may include a transistor MN2, an amplifier A2 and a resistor Rs2, and the third tracker 116 may include a transistor MN3, an amplifier A3 and a resistor Rs3.

The descriptions of the impedance unit 121 and the current generator 122 overlap those of FIGS. 4 and 5 described above, and thus the descriptions thereof will be omitted.

Figure 15:
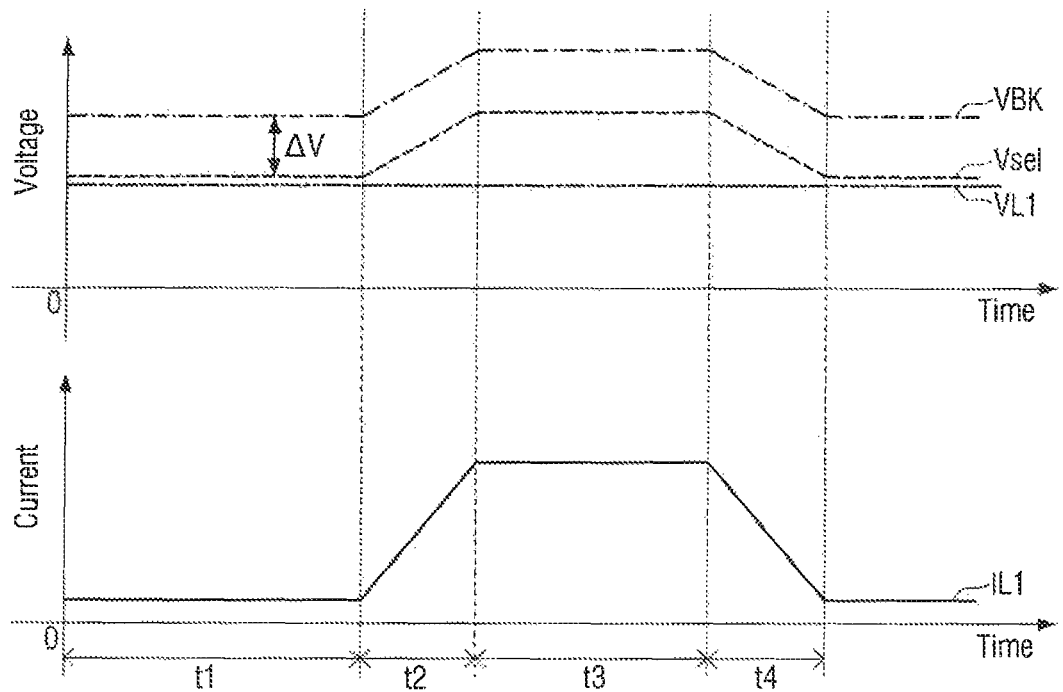
FIG. 15 is a voltage graph and a current graph for describing an operation of the power management integrated circuit in FIG. 13.

According to some embodiments, when the power tracker 100-4 is implemented as illustrated in FIG. 13, the output current IL as well as the output voltage VL may be tracked to detect the selection signal Vsel. FIG. 15 will be described as an example.

FIG. 15 is a voltage graph and a current graph for describing an operation of the power management integrated circuit in FIG. 13.

Referring to FIG. 15, the LDO 21 may output an output current IL1 and an output voltage VL1 based on the input voltage VBK. It is assumed that the output voltage VL1 is kept constant, but a level of the output current IL varies. For convenience of description, a case in which only one LDO 21 is turned on and operated will be described.

The output current IL1 is maintained at a constant value in a t1 section and increases in a t2 section, and the output current IL1 is constant in a t3 section and decreases in a t4 section and is then kept constant in a post-t4 section.

Even if the output voltage VL1 is constant, when the output current IL1 increases in the t2 and t3 sections, the voltage input to the non-inversion terminal of the amplifier A1 increases by the input resistor Rs1. Accordingly, the comparison signal output from an output terminal of the amplifier A1 may vary depending on a change in the output current IL1, and the selection signal Vsel may also vary according to the comparison signal. In other words, even if the output voltage VL1 is constant, the selection signal Vsel may vary in proportion to the output current IL1. In addition, since the input voltage VBK generated by the sub-regulator 10 is also generated from the reference voltage Vref based on the selection signal Vsel, the input voltage VBK also varies according to the output current IL1 like the selection signal Vsel.

Figure 16:
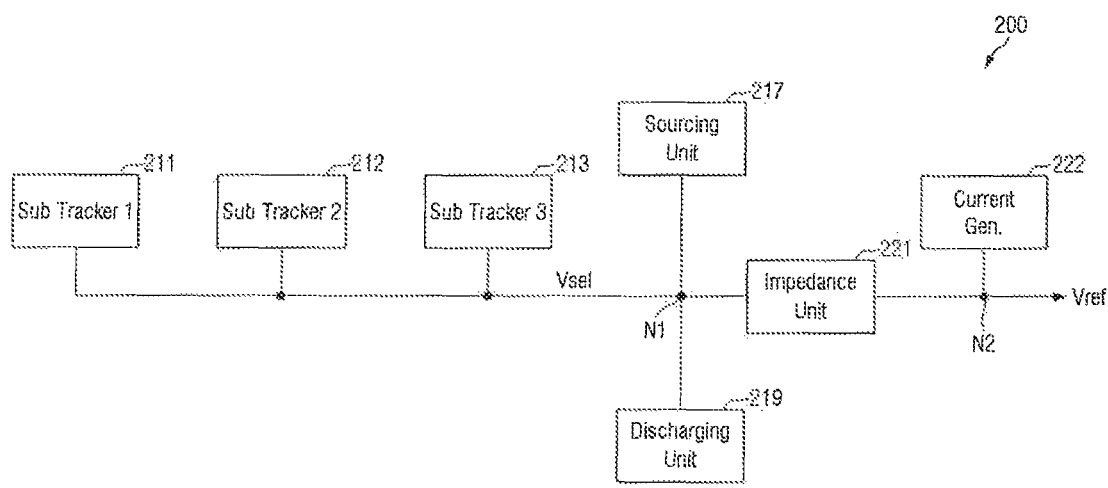
FIG. 16 is a block diagram illustrating the power tracker according to some embodiments of the present disclosure.

FIG. 16 is a block diagram illustrating the power tracker according to some embodiments.

Referring to FIG. 16, a power tracker 200 according to some embodiments may be implemented to include all of a plurality of sub-trackers 211, 212 and 213, a sourcing unit 217, a discharging unit 219, an impedance unit 221, and a current generator 222.

To track the output signal of the regulator (e.g., the LDO in FIG. 1 or the loop circuit in FIG. 9), the power tracker 200 may use the sub-trackers 211, 212 and 213 and the sourcing unit 217 according to one embodiment, or may use the sub-trackers 211, 212 and 213 and the discharging unit 219 according to another embodiment.

The power tracker 200 may use the impedance unit 221 and the current generator 222 according to characteristics of the IP 2 connected to the power management integrated circuit, may apply and use a pre-stored offset voltage to the aggregation node N2, or operate by using the selection voltage Vsel as the reference voltage Vref without applying the pre-stored offset voltage without the impedance unit 221 and the current generator 222.

Although the embodiments of the present disclosure have been described above with reference to the accompanying drawings, the present disclosure is not limited to the disclosed embodiments, but may be implemented in various different ways without departing from the scope of the present disclosure as will be understood by those skilled in the art. Therefore, embodiments set forth herein are examples and are not to be construed as limiting.

What is claimed is:

1. A power management integrated circuit, comprising:
a first regulator configured to provide a first output signal to a component;
a second regulator configured to provide a second output signal to the component;
a third regulator configured to provide a third output signal to the component;
a power tracker configured to track first, second and third output signals, aggregate an offset voltage with a selection signal, and generate a reference voltage, wherein the selection signal corresponds to one of the first, second and third output signals; and
a sub-regulator configured to generate an input voltage corresponding to the reference voltage and provide the generated input voltage to the first, second and third regulators,
wherein the power tracker comprises:
a current generator configured to generate an offset current according to a reference control signal;

an impedance unit provided with the offset current and configured to output the offset voltage;

a first tracker connected to an output terminal of the first regulator and configured to track the first output signal;

a second tracker connected to an output terminal of the second regulator and configured to track the second output signal;

a third tracker connected to an output terminal of the third regulator and configured to track the third output signal; and a discharging unit connected to a common output node of the first tracker, the second tracker, and the third tracker and configured to discharge a current along a voltage direction of the selection signal.

2. The power management integrated circuit of claim 1, wherein the first output signal, the second output signal, and the third output signal are at least one of a first output voltage, a second output voltage, and a third output voltage, or a first output current, a second output current, and a third output current.

3. The power management integrated circuit of claim 1, wherein a level of the input voltage tracks the selection signal.

4. The power management integrated circuit of claim 1, wherein the first tracker comprises:
a first amplifier configured to compare an output signal of the first regulator with the selection signal of the common output node and output a comparison signal; and
a transistor connected between a power terminal and the common output node and configured to generate the selection signal corresponding to the comparison signal.

5. The power management integrated circuit of claim 1, wherein the discharging unit is a resistor connected between the common output node and a ground terminal.

6. The power management integrated circuit of claim 1, wherein the discharging unit is a current source connected between the common output node and the ground terminal to emit a preset current.

7. The power management integrated circuit of claim 1, wherein the current generator comprises:
a reference amplifier configured to output a reference signal by comparing a control voltage with an output voltage of a comparison node;
a first reference transistor connected between the power terminal and the comparison node and gated by the reference signal;
a reference resistance connected between the comparison node and the ground terminal; and
a second reference transistor connected between the power terminal and an aggregation node and configured to generate the offset current corresponding to the reference signal.

8. The power management integrated circuit of claim 7, further comprising an impedance resistor connected between the common output node and the aggregation node, wherein the impedance resistor is the impedance unit.

9. A power management integrated circuit, comprising:
a first loop circuit configured to output a first output signal;
a second loop circuit configured to output a second output signal;
a third loop circuit configured to output a third output signal;
a power tracker configured to track the first, second and third output signals, aggregate an offset voltage with a selection signal which corresponds to one of the first, second and third output signals, and generate a reference voltage; and
a charging circuit configured to generate an input voltage corresponding to the reference voltage and provide the input voltage to the first, second and third loop circuits,
wherein the power tracker comprises:
a first tracker configured to track the first output signal;
a second tracker configured to track the second output signal;
a third tracker configured to track the third output signal;
a sourcing unit connected to a common output node of the first tracker, the second tracker, and the third tracker; and
a voltage generator configured to output the reference voltage corresponding to the selection signal output from the common output node,
wherein the sourcing unit is a current source configured to emit a discharging current from the common output node.

10. The power management integrated circuit of claim 9, wherein a level of the input voltage is tracked with respect to the selection signal.

11. The power management integrated circuit of claim 10, wherein the voltage generator comprises:
an impedance unit having an end connected to the common output node; and
a current generator configured to provide a variable offset current to the impedance unit and generate an offset voltage;
wherein the offset voltage is aggregated with the selection signal to output the reference voltage.

12. The power management integrated circuit of claim 11, wherein the impedance unit is a programmable resistor.

13. The power management integrated circuit of claim 11, wherein the current generator comprises:
a reference amplifier configured to output a reference signal by comparing a control voltage with an output voltage of a comparison node;
a comparison reference transistor having a first terminal connected to the comparison node and gated with the reference signal;
a first reference complementary transistor connected between a second terminal of the comparison reference transistor and a power terminal and gated by a signal of a second terminal of the comparison reference transistor;
a second reference complementary transistor gated by the signal of the second terminal of the comparison reference transistor and connected between the power terminal and the aggregation node, and configured to generate the offset current corresponding to the reference signal; and
a reference resistor connected between the comparison node and the ground terminal.

14. The power management integrated circuit of claim 10, wherein the first tracker comprises:
a first amplifier configured to compare the first output signal with the selection signal of the common output node and output a comparison signal; and
a transistor connected between the power terminal and the common output node and configured to generate the selection signal corresponding to the comparison signal.

15. A power management integrated circuit, comprising:
a first regulator configured to output a first output voltage and a first output current;

a second regulator configured to output a second output voltage and a second output current;

a third regulator configured to output a third output voltage and a third output current;

a power tracker configured to track the first, second and third output voltages and the first, second and third output currents, aggregate an offset voltage with a selection signal, and generate a reference voltage, wherein the selection signal corresponds to the first output voltage, the second output voltage, the third output voltage, the first output current, the second output current or the third output current; and a sub-regulator configured to generate an input voltage corresponding to the reference voltage and provide the generated input voltage to the first, second and third regulators, wherein the power tracker comprises:

a first tracker including a first amplifier configured to compare the selection signal of the common output node with the first output voltage and the first output current and output a first comparison signal, and a first transistor connected between a power terminal and the common output node;

a second tracker including a second amplifier configured to compare the selection signal of the common output node with the second output voltage and the second output current and output a second comparison signal, and a second transistor connected between the power terminal and the common output node; and a third tracker including a third amplifier configured to compare the selection signal of the common output node with the third output voltage and the third output current and output a third comparison signal, and a third transistor connected between the power terminal and the common output node, wherein the smallest value among the output signals of each of the first transistor, the second transistor, and the third transistor is output as the selection signal via the common output node.

16. The power management integrated circuit of claim 15, wherein the first amplifier comprises:

a first input terminal connected to the common output node;

a second input terminal connected to a first end of an input resistor; and an output terminal connected to a gate of the first transistor and configured to output the first comparison signal, wherein the first output current is provided to the first end of the input resistor and the first output voltage is provided to a second end of the input resistor.

\* \* \* \* \*